United States Patent
Groos et al.

(10) Patent No.: US 6,794,597 B2
(45) Date of Patent: Sep. 21, 2004

(54) WIRE ELECTRODE WITH A STRUCTURED INTERFACE SURFACE

(75) Inventors: Heinrich Groos, Herborn (DE); Bernd Barthel, Herborn (DE); Tobias Noethe, Herborn (DE); Christoph Dietrich, Herborn (DE)

(73) Assignee: Berkenhoff GmbH, Heuchelheim (DE)

( * ) Notice: Subject to any disclaimer, the term of this patent is extended or adjusted under 35 U.S.C. 154(b) by 9 days.

(21) Appl. No.: 10/245,128

(22) Filed: Sep. 17, 2002

(65) Prior Publication Data

US 2003/0057190 A1 Mar. 27, 2003

(30) Foreign Application Priority Data

Sep. 21, 2001 (EP) .............................................. 01122792

(51) Int. Cl.$^7$ ................................................ B23H 1/00
(52) U.S. Cl. ................................... 219/69.12; 219/69.11
(58) Field of Search .......................... 219/69.12, 69.11, 219/69.15, 69.17

(56) References Cited

U.S. PATENT DOCUMENTS 4,341,939 A * 7/1982 Briffod et al. ........... 219/69.12
4,766,280 A * 8/1988 Groos ...................... 219/69.12
4,924,050 A * 5/1990 Hermanni ................... 148/536
5,196,665 A * 3/1993 Briffod ..................... 219/69.12
5,945,010 A * 8/1999 Tomalin ................... 219/69.12

FOREIGN PATENT DOCUMENTS

| GB | 2 087 778 | 6/1982 |
|----|-----------|--------|
| JP | 56-152531 | 11/1981 |
| JP | 3-49829 | 3/1991 |

* cited by examiner

Primary Examiner—M. Alexandra Elve
(74) Attorney, Agent, or Firm—Flynn, Thiel, Boutell & Tanis, P.C.

(57) ABSTRACT

In order to achieve a reduction in wear of the wire guide rollers, apart from an improvement in the cutting speed and an improvement in current conduction, a wire electrode for spark erosion cutting of metals etc., comprising either a homogenous center (1) made of a metal or of a metal alloy, or a composite center, is provided with a sheath coating (2) whose surface is structured, wherein the indentations (3) created by the structure, are filled by a filler (4) made of an easily vapourable metal or of a metal alloy, so as to achieve a surface with little peak-to-valley height, i.e. with little surface roughness.

18 Claims, 3 Drawing Sheets ial structure. This helicoidal structure can also be made with a significantly increased lead, with indentations which extend up to perpendicular to the wire axis. After completion of the sheath coating 2 with the structured surface, for example made of a β-brass, the indentations 3 in the sheath coating 2 are then filled in by filler 4 made of a metal or a metal alloy, said filler 4 being made from a γ-brass comprising a high zinc content, or from pure zinc. Furthermore, it is also possible to use zinc alloys comprising more than 90% zinc. It is only necessary that this filler 4 evaporates very quickly during the erosion process so that the structured surface of the actual sheath coating 2 is available for the subsequent erosion process.

WIRE ELECTRODE WITH A STRUCTURED INTERFACE SURFACE

FIELD OF THE INVENTION

The invention relates to a wire electrode for spark erosion cutting of metals, electrically-conducting ceramics etc., comprising either a homogenous centre made of a metal or of a metal alloy, or a composite centre and comprising at least one sheath coating which wears during erosion.

BACKGROUND OF THE INVENTION

When using wire electrodes it has been shown that wire electrodes comprising sheath coatings, wherein the sheath coating for example comprises β-brass or γ-brass, have a better cutting performance than electrodes without such sheath coatings. This is due to the fact that the β/γ-sheath coating comprises a high zinc content which is embedded in the microstructure. Such wire electrodes comprising β-brass sheath coatings or γ-brass sheath coatings have a disadvantage in that the sheath coating with its cubic body-centred lattice is significantly less well deformable than the centre which usually comprises a cubic face-centred α-brass. This results in the surface of such a sheath electrode ripping up in sections. During this process, cracks form which, as has been shown in investigations, have a certain advantage in some respect, because this obviously supports clearing the cutting gap. Consequently, in the case of higher workpieces, improved cutting performance is achievable with such electrodes comprising a rough surface. Such wire electrodes are however associated with a disadvantage in that due to the irregular and fissured hard surface, both guidance of the wire and current conduction to the wire, are impeded. Such a sheath coating is very rough and hard, so that guides wear relatively quickly. Furthermore, vibrations in the wire are generated which also further impede current conduction. These vibrations are also disadvantageous for guiding the wire in the gap because the wire electrode is excited to produce oscillations which can lead to short circuits.

It is the object of the invention to improve a wire electrode of the type mentioned in the introduction so that the advantages of improved cutting performance obtained by the fissured surface of the sheath coating, are maintained, without the disadvantages of diminished current transition and increased wear and increased oscillations in the wire, having to be accepted. It is a further object of the invention to provide such an electrode with a surface structure which leads to a further improvement in performance.

SUMMARY OF THE INVENTION

According to the invention, this object is met in that the surface of the outer sheath coating is structured and in that the indentations created by the structure are filled in with a filler comprising an easily vapourable metal or a metal alloy for obtaining a surface with a short peak-to-valley height and thus little surface roughness.

If the fissures in the sheath coating, created during the manufacture of coated wire electrodes, are filled in with an easily vapourable metal or a metal alloy comprising zinc or a zinc alloy, with the zinc fraction in the alloy being significantly above the zinc fraction in the sheath coating, then a wire electrode with a smooth outside surface is obtained which can be transported in the wire guides with only slight wear, wherein the entire contacting surface can be used for current conduction, with irregularities which can cause vibrations and which impede current conduction, being avoided. In this way it is possible to considerably increase the current feed to the electrode. During the subsequent erosion process in the cutting gap, the filler which is present in the fissures or grooves is used up first so that along most of the length of the cutting gap a sheath coating is available for the erosion process, which sheath coating comprises a strongly fissured surface. As a result of this fissured surface, the discharge of the eroded material is improved while at the same time field intensity peaks and thus locations of increased discharge probability and associated with this an increase in the discharge frequency, are generated by the projections.

During normal manufacture of wire, during which due to the different deformation behaviour of centre and sheath coating, fissures are produced in the sheath coating, the above-mentioned locations with increased field intensity peaks are generated purely at random. However, if the surface of the sheath coating comprises grooves which can be shaped so as to be longitudinal, transverse, helicoidal or intersecting, then such locations with an increased discharge probability are provided. This significantly accelerates the erosion process also for the reason that here there is a significant increase in the probability of discharge not occurring in the crater of a discharge which has been generated shortly beforehand. Thus, an even discharge distribution is achieved as a result of the structured surface. At the same time this results in a reduction in the risk of the wire breaking. These grooves or indentations are at least 2 μm in depth and at most 50 μm in depth.

A further advantage achieved, namely that of preventing local discharge accumulation, consists of the discharges being more often enclosed by a liquid dielectric instead of a gas bubble. As a result of the associated more pronounced contraction of the plasma channel, there is greater materials removal per discharge, which clearly has a positive effect on the cutting performance of the wire electrode.

DETAILED DESCRIPTION

Figure 1:
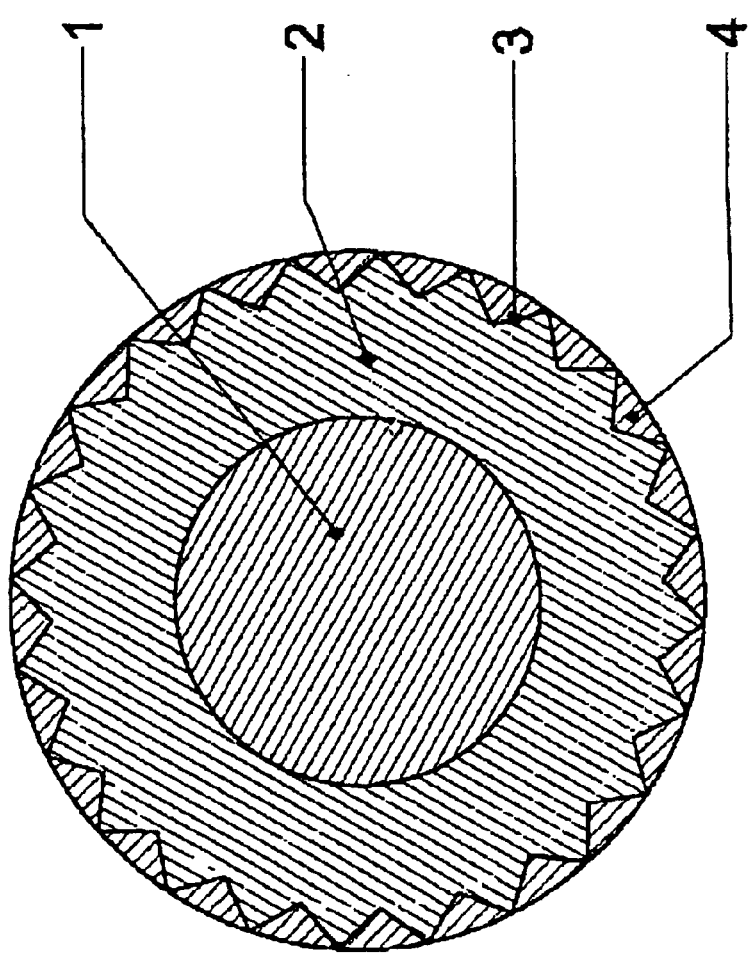
FIG. 1 shows a diagrammatic representation of a cross section of a wire electrode according to the invention.
Figure 2:
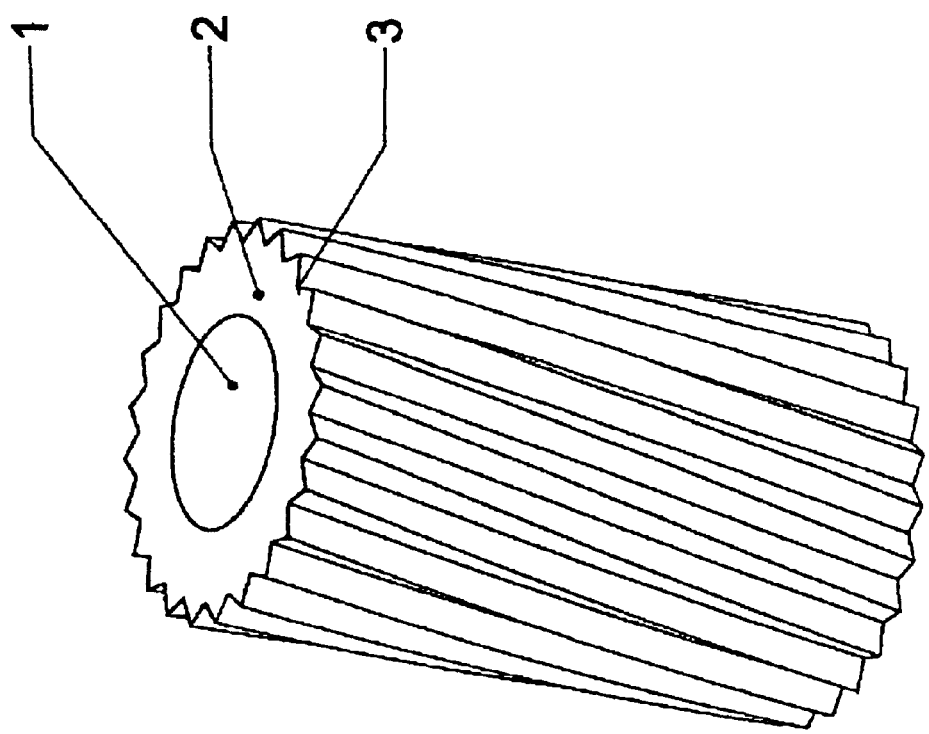
FIG. 2 shows a lateral view of the wire electrode with the structured surface being exposed.
Figure 3:
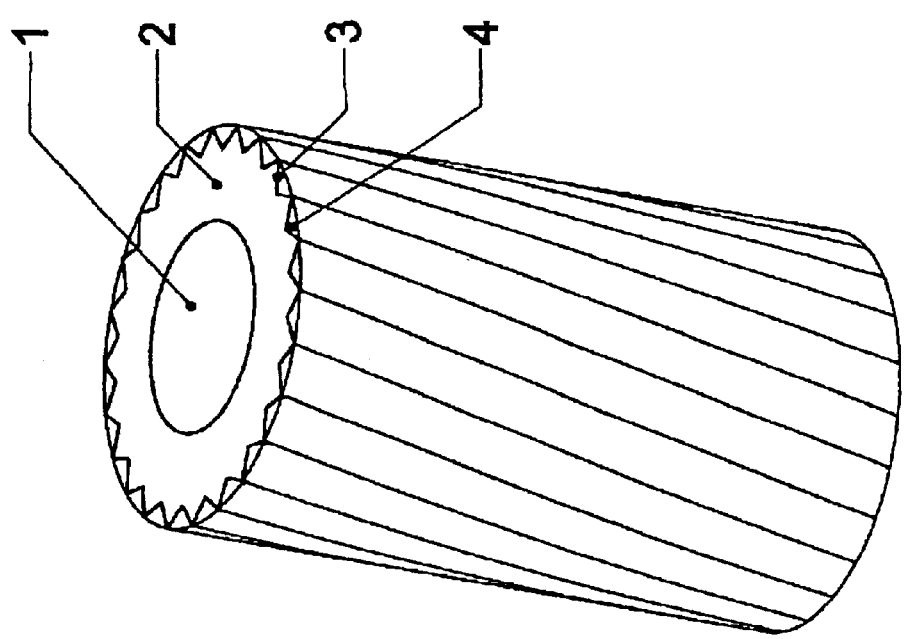
FIG. 3 shows a perspective view of the completed wire electrode.

In FIG. 1, reference no. 1 denotes the centre of the wire electrode, said centre can comprise copper, brass or a composite electrode which can for example have a steel core surrounded by a copper coating. Applied to this centre 1 is a sheath coating 2 whose surface is structured. In FIGS. 2 and 3, this structure is a helicoidal structure. This helicoidal structure can also be made with a significantly increased lead, with indentations which extend up to perpendicular to the wire axis. After completion of the sheath coating 2 with the structured surface, for example made of a β-brass, the indentations 3 in the sheath coating 2 are then filled in by filler 4 made of a metal or a metal alloy, said filler 4 being made from a γ-brass comprising a high zinc content, or from pure zinc. Furthermore, it is also possible to use zinc alloys comprising more than 90% zinc. It is only necessary that this filler 4 evaporates very quickly during the erosion process so that the structured surface of the actual sheath coating 2 is available for the subsequent erosion process.

The peaks between the indentations form locations of increased field intensity so that there is a very good probability that discharge takes place at these peaks. This leads to a spatial distribution of the subsequent charges, so that there is a very good probability that these discharges are more frequently surrounded by a liquid dielectric. At the same time, removal of the eroded material is improved as a result of the structure of the surface. A knob-like structure of the surface of the sheath coating has been shown to be particularly advantageous.

What is claimed is:

1. A wire electrode for spark erosion cutting, comprising one of a homogenous center made of a metal or a metal alloy, and a composite center, and further comprising at least one outer sheath coating that wears during erosion, wherein a surface of the outer sheath coating is structured with indentations that are filled in with a filler comprising an easily evaporable metal or a metal alloy for smoothing and thereby obtaining a surface with a short peak-to-valley height.

2. The wire electrode according to claim 1, wherein the filler comprises zinc or a zinc alloy.

3. The wire electrode according to claim 1, wherein the filler comprises a γ-brass.

4. The wire electrode according to claim 1, wherein the indentations are larger than 2 μm and smaller than 50 μm.

5. The wire electrode according to claim 1, wherein the indentations are approximately 15 μm.

6. The wire electrode according to claim 1, wherein the indentations in the surface of the wearing sheath coating comprise longitudinal grooves.

7. The wire electrode according to claim 1, wherein the indentations in the surface of the wearing sheath coating comprise transverse grooves.

8. The wire electrode according to claim 1, wherein the indentations in the surface of the wearing sheath coating comprise spiral grooves.

9. The wire electrode according to claim 1, wherein the surface of the wearing sheath coating is knob-shaped.

10. The wire electrode according to claim 1, wherein the sheath coating predominantly comprises β-brass, and wherein the fraction of β/β'-phase in the sheath coating is at least 60%.

11. The wire electrode according to claim 1, wherein the sheath coating comprises β-brass of at least 90% β/β'-phase.

12. The wire electrode according to claim 1, wherein the center comprises copper or brass.

13. The wire electrode according to claim 1, wherein the center is a composite center comprising a steel core with a copper coating or brass coating.

14. The wire electrode according to claim 1, wherein the indentations comprise grooves.

15. The wire electrode according to claim 1, wherein the indentations comprise a predetermined pattern of indentations.

16. A wire electrode for spark erosion cutting comprising:

a homogenous or composite center;

at least one outer sheath coating surrounding the center and having an outer surface with a predetermined pattern of indentations; and a filler contained within the indentations of the outer sheath coating to provide a smooth outer surface, wherein the smooth outer surface is capable of minimizing wear of the wire electrode during transportation of the wire electrode in wire guides, and wherein said filler comprises a material that vaporizes during the erosion process.

17. The wire electrode according to claim 16, wherein the predetermined pattern of indentations comprises a predetermined pattern of grooves.

18. The wire electrode according to claim 16, wherein the center comprises a metal or a metal alloy.

\* \* \* \* \*

UNITED STATES PATENT AND TRADEMARK OFFICE
CERTIFICATE OF CORRECTION

PATENT NO. : 6,794,597 B2
DATED : September 21, 2004
INVENTOR(S) : Heinrich Groos et al.

It is certified that error appears in the above-identified patent and that said Letters Patent is hereby corrected as shown below:

Column 3,
Line 16, change "easily evaporable" to -- easily vaporable --.

Signed and Sealed this

Twelfth Day of April, 2005

JON W. DUDAS
*Director of the United States Patent and Trademark Office*